United States Patent [19]

Ogawa et al.

[11] Patent Number: 4,550,923
[45] Date of Patent: Nov. 5, 1985

[54] FUEL SUPPLYING MEANS INSTALLED ON A LATERAL CROSS MEMBER OF A VEHICLE

[75] Inventors: Hisashi Ogawa, Okazaki; Yasushi Tanaka; Yoshimitsu Sato, both of Toyota, all of Japan

[73] Assignee: Toyota Jidosha Kabushiki Kaisha, Aichi, Japan

[21] Appl. No.: 578,119

[22] Filed: Feb. 8, 1984

[30] Foreign Application Priority Data

Feb. 28, 1983 [JP] Japan .................................. 58-028498

[51] Int. Cl.⁴ .......................................... B60K 15/04
[52] U.S. Cl. ..................................... 280/5 A; 137/354
[58] Field of Search ............... 280/5 A, 5 R; 296/204, 296/208; 137/354, 587; 251/143

[56] References Cited

U.S. PATENT DOCUMENTS

| | | | |
|---|---|---|---|
| 3,800,978 | 4/1974 | Sigwald | 280/5 A |
| 3,805,829 | 4/1974 | Kamamoto | 280/5 A |
| 4,457,525 | 7/1984 | Tanaka | 280/5 A |
| 4,469,339 | 9/1984 | Watanabe | 280/5 A |

FOREIGN PATENT DOCUMENTS 902228 12/1953 Fed. Rep. of Germany ..... 280/5 A

*Primary Examiner*—Joseph F. Peters, Jr.
*Assistant Examiner*—Everett G. Diederiks, Jr.
*Attorney, Agent, or Firm*—Parkhurst & Oliff

[57] ABSTRACT

Fuel supplying means for supplying fuel into a fuel tank provided under a floor tunnel for use in a front engine-front wheel drive vehicle or a rear engine-rear wheel drive type vehicle. The fuel supplying means includes an inner filler pipe connected to the fuel tank and an outer filler pipe extending along a cross member located across the vehicle. An inner end of the outer filler pipe is connected through a hose to the inner filler pipe. The outer filler pipe has a bracket for fastening the outer filler pipe to the vehicle body.

18 Claims, 6 Drawing Figures

4,550,923

FUEL SUPPLYING MEANS INSTALLED ON A LATERAL CROSS MEMBER OF A VEHICLE

BACKGROUND OF THE INVENTION

The present invention relates to a fuel supplying means for use in a vehicle, and more particularly to a structure for a fuel supplying means installed on a cross member extending laterally across a vehicle.

In general, a vehicle, particularly a passenger car, is equipped with a fuel tank located behind a passenger seat in a passenger compartment. This construction results in a smaller space behind the passenger seat because of the size of the fuel tank. Various car constructions have overcome this disadvantage by eliminating the need for a drive shaft between an engine forwardly located and driving wheels rearwardly located by providing both the engine and drive wheels in either a forward location or a rearward location in the vehicle. Therefore, a floor tunnel, which would ordinarily house the drive shaft, can contain a longitudinal fuel tank, as shown in FIG. 5.

FIG. 5 shows a schematic cross-sectional view of a vehicle with a known structure for a fuel supplying means. The vehicle M, has a rear engine and a rear drive, with an engine 6 located over rear wheels 7. A pair of passenger seats 5 are provided next to the floor tunnel 2 on laterally opposite sides of the floor tunnel 2. The vehicle M has a fuel tank 3, which is fastened by a plurality of bands 10 onto a floor panel 1. The fuel tank 3 is provided under a floor tunnel 2, which longitudinally extends between a dash panel 8 and a back panel 9 in the vehicle M.

FIG. 6 shows a detailed view of the rear part of the fuel tank 3, shown in FIG. 5. A cross member 11 laterally extends across the vehicle M and is located behind the rear end of the fuel tank 3. A filler pipe 12 extends between a fuel inlet port 14 and the rear end of the fuel tank 3. The fuel inlet port 14 is located in the rear side portion of the vehicle body. The filler pipe 12 extends through a hole 13 created in the back panel 9. FIG. 6 shows that the rear end of the floor tunnel 2 extends to the back panel 9 and approaches to the cross member 11, which is connected with the lower end of the back panel 9, at an upper portion thereof. Because the fuel tank 3 is located in the lower portion of the vehicle M, the filler pipe 12 is provided between the rear end of the fuel tank 3 and the fuel inlet port 14. The filler pipe 12 must not contact the cross member 11, to avoid any scratching thereon, when the filler pipe 12 is assembled into the vehicle. Hence, it has been proposed that the filler pipe 12 should extend through the hole 13 to the rear vehicle body, as shown in FIG. 6. However, this construction results in a narrower space behind the back panel 9. Further, it is difficult to assemble the fuel tank 3 into the floor tunnel 2 in the condition that the filler pipe 12 does not contact the cross member 11.

Generally, vehicles having a rearwardly located engine and rearwardly located drive wheels have auxiliary parts, such as a charcoal canister for adsorbing evaporated fuel, a fuel filter and an oil cooler (for use with a torque converter) located on the back panel 9. The location of the filler pipe 12 behind the back panel 9 and over the cross member 11, makes it difficult to place the auxiliary parts in the narrow space behind the back panel 9.

SUMMARY OF THE INVENTION

The present invention was made in view of the foregoing background and to overcome the foregoing drawbacks. It is accordingly an object of this invention to provide a fuel supplying means that can be easily installed in a vehicle while minimizing the amount of space used.

To attain the above objects, a means for supplying fuel into a fuel tank, which is provided under a floor panel, includes a pair of filler pipes and a connecting means for connecting an end of one filler pipe with an end of another filler pipe. The filler pipes comprises an inner filler pipe connected to the fuel tank at one end thereof and rearwardly extending in the vehicle, and an outer filler pipe having an inlet port for fuel entering the system, at an outer end thereof and extending along the cross member.

The above objects, features and advantages of the present invention will become more apparent from the following description of the preferred embodiment taken in conjunction with the accompanying drawings.

DETAILED DESCRIPTION OF THE PREFERRED EMBODIMENT

The present invention is described in detail with reference to the accompanying drawings which illustrate an embodiment of the present invention.

Figure 1:
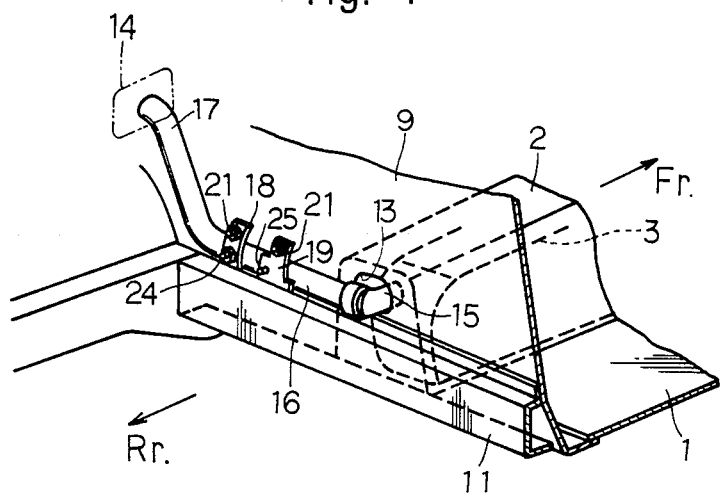
FIG. 1 is a perspective view of an embodiment of a fuel supplying means according to the present invention.
Figure 2:
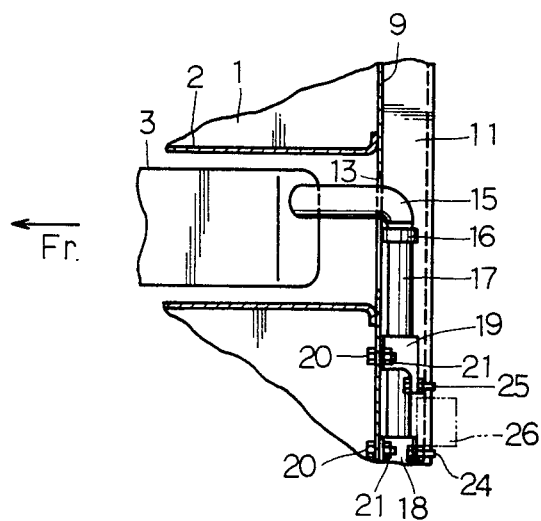
FIG. 2 is a partial plan view of an embodiment according to the present invention.

Referring now to the drawings, wherein the same reference characters designate corresponding parts throughout the several views, FIG. 1 shows a perspective view of the fuel supplying means according to the present invention, as viewed from the rear of a vehicle. A floor panel 1, which longitudinally extends along a bottom portion of the vehicle, has a lateral central portion which upwardly projects from the floor panel 1 to form a floor tunnel 2. The rearward end of the floor panel 1 is fixed to a back panel 9. The floor panel 1 longitudinally extends toward and stops at the back panel 9 in the vehicle. A fuel tank 3 is provided within the floor tunnel 2. The back panel 9 laterally extends across the vehicle, and has a hole 13 at a middle portion thereof, as shown in FIG. 2.

A cross member 11, located vertically below the hole 13, laterally extends across the vehicle, and has a closed cross-sectional form. A filler pipe, for pumping fuel into the tank, comprises an inner filler pipe 15 and an outer filler pipe 17. The inner filler pipe 15 has a L-shape and is connected to the fuel tank 3 at a first end thereof. The inner filler pipe extends through the hole 13 in the back panel to a position over the lateral cross member 11. The outer filler pipe 17 extends from a fuel inlet port 14, provided on the outer surface of the vehicle body, along the upper surface of the cross member 11 and is connected through a hose 16 with a second end of the inner filler pipe 15. The outer filler pipe 17 extends to the vicinity of the hole 13, and a pair of brackets 18 and 19 are separately attached at different positions on the back surface of the back panel 9 and are welded to the filler pipe 17, thereby fastening the pipe 17 to the back panel 9.

Figure 3:
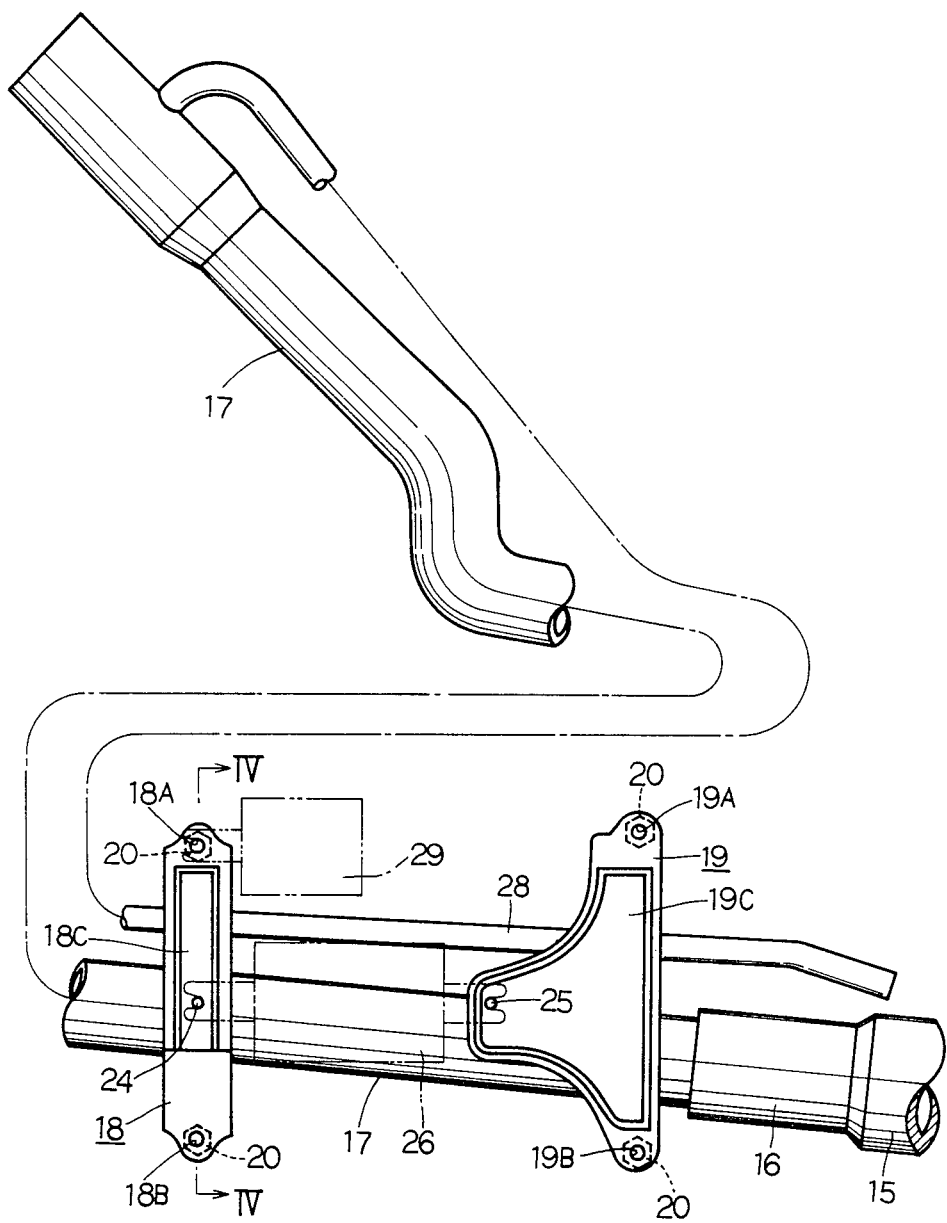
FIG. 3 is an enlarged detailed view of a filler pipe of an embodiment according to the present invention.
Figure 5:
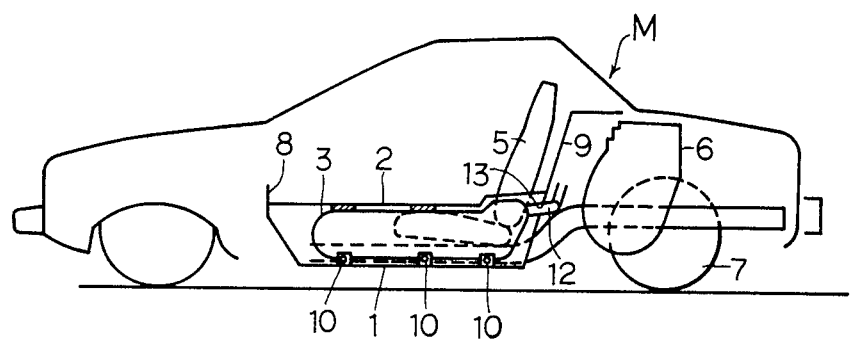
FIG. 5 is a side cross-sectional view of a vehicle employing a fuel supplying means according to prior art.
Figure 6:
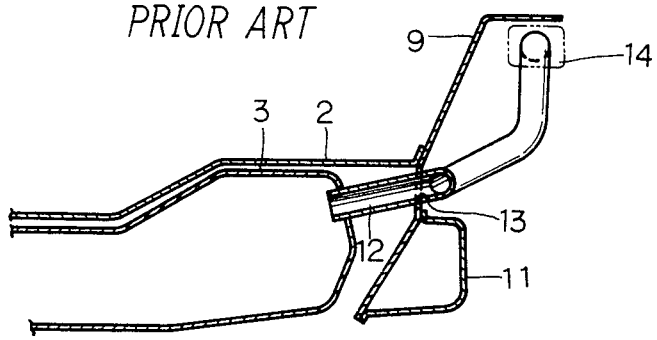
FIG. 6 is an enlarged cross-sectional view of the fuel supplying means shown in FIG. 5.

The brackets 18 and 19 have holes 18A, 18B and 19A, 19B, respectively, for fastening bolts therein, as shown in FIG. 3. The forward surface of the back panel 9 has bolts 20 welded thereon, at positions corresponding to the holes 18A, 18B and 19A, 19B. The bolts 20 penetrate the holes 18A, 18B and 19A, 19B of the brackets 18 and 19 and nuts 21 engage with the bolts 20 to fix the outer filler pipe 17 to the back panel 9.

The brackets 18 and 19 have central portions 18C and 19C, respectively, which upon installation outwardly expand toward the rear of the vehicle. The back surface of the central portions 18C and 19C include bolts 24 and 25, respectively, which are welded onto the back surface and rearwardly extend.

Figure 4:
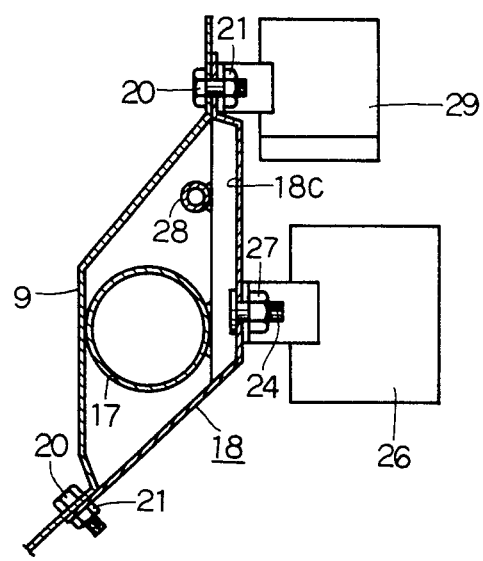
FIG. 4 is an enlarged cross-sectional view taken along the line IV—IV in FIG. 3.

A charcoal canister 26 adsorbs evaporated fuel and is located between the bolts 24 and 25. The charcoal canister 26 is fastened by the nut 27 to the outer filler pipe 17. The numeral 28 designates a breather pipe which is located substantially parallel to the outer filler pipe 17 and is vertically above the outer filler pipe 17. The brackets 18 and 19 are fixed to the breather pipe 28 by welding. The numeral 29, shown in FIGS. 3 and 4, designates a fuel filter 29, which is fastened to the back panel 9 at one end thereof by the bolt 20 and nut 21.

In accordance with this embodiment, because the outer filler pipe 17 extends to the vicinity of the hole 13 in the back panel 9, and the inner filler pipe 15 is designed to have a short length, it is easy to connect the inner filler pipe 15 to the fuel tank 3, which is located under the floor tunnel 2. Additionally, the inner filler pipe 15 seldom contacts the lateral cross member 11 at assemblying the same.

The brackets 18 and 19 may be fastened to the cross member 11 at the lower ends thereof.

While the present invention has been described in its preferred embodiments, it is to be understood that the invention is not limited thereto, and may be otherwise embodied within the scope of the following claims.

What is claimed is:

1. A vehicle body, having a floor tunnel longitudinally extending in the vehicle, a cross member laterally extending across the vehicle at a position under the floor tunnel, a means for supplying fuel into a fuel tank provided underneath and within the floor tunnel, and article means for filtering fuel and absorbing evaporated fuel, said vehicle body comprising:
 an inner filler pipe having a first end and a second end, the first end connected to the fuel tank and the pipe extending toward the rear of the vehicle to a position which is vertically above the lateral cross member;
 an outer filler pipe having a first end and a second end, the first end comprising an inlet port for accepting fuel therein and the second end of said inner filler pipe, the outer filler pipe extending substantially along the laterally extending cross member and substantially above said lateral cross member;
 means for connecting the second end of the inner filler pipe with the second end of the outer filler pipe;
 means for fastening the outer filler pipe to the vehicle body, said outer filler pipe located between the vehicle body and said fastening means; and
 an engagement device mounted on said fastening means, said engagement device holding said article means on said fastening means.

2. The vehicle body of claim 1, wherein the vehicle body further comprises a back panel secured to a rearward end of the floor tunnel, the back panel having a hole therethrough for allowing the inner filler pipe to extend therethrough toward the rear of the vehicle body.

3. The vehicle body of claim 2, wherein the cross member is located on a rearward side of the back panel in the vehicle.

4. The vehicle body of claim 1, wherein the means for connecting the second end of the inner filler pipe with the second end of the outer filler pipe comprises a hose provided between the inner filler pipe and the outer filler pipe.

5. The vehicle body of claim 3, wherein the means for fastening the outer filler pipe to the vehicle body comprises:
 a bracket having a hole thereon;
 a bolt welded to a surface on the back panel; and
 a nut for said bolt to fix the bracket to the back panel, whereby said outer filler pipe is located between the back panel and the bracket.

6. The vehicle body of claim 1, wherein said fastening means is in contact with said outer filler pipe on a first surface thereof and said fastening means has said engagement device on a second surface thereof.

7. The vehicle body of claim 6, wherein the first surface of said fastening means faces a front end of the vehicle, and the second surface of said fastening means faces a rear end of the vehicle.

8. The vehicle body of claim 1, wherein the article means held on said fastening means includes a charcoal canister.

9. The vehicle body of claim 1, wherein the article means held on said fastening means includes a fuel filter.

10. The vehicle body of claim 1, further comprising a second fastening means for fastening said outer filler pipe to the back panel, said second fastening means having a second engagement device.

11. The vehicle body of claim 10, wherein the article means is held on said fastening means and said second fastening means by said engagement device and said second engagement device.

12. A vehicle body, having a laterally extending back panel for defining a rear end of a passenger compartment of a vehicle, means for supplying fuel into a fuel tank provided underneath a floor of the vehicle, and at least one article means for filtering fuel and absorbing evaporated fuel, said vehicle body comprising:
 a filler pipe having a first end and a second end, the first end connected to the fuel tank, the second end having an inlet port for accepting fuel, the filler pipe extending along the back panel;
 means for fastening said filler pipe to the back panel, said filler pipe sandwiched between the back panel and said fastening means; and
 an engagement device mounted on said fastening means, the engagement device holding said article means on said fastening means.

13. The vehicle body of claim 12, wherein said fastening means is in contact with said outer filler pipe on a first surface thereof and said fastening means has said engagement device on a second surface thereof.

14. The vehicle body of claim 13, wherein the first surface of said fastening means faces a front end of the vehicle, and the second surface of said fastening means faces a rear end of the vehicle.

15. The vehicle body of claim 12, wherein the article means held on said fastening means is a charcoal canister.

16. The vehicle body of claim 12, wherein the article means held on said fastening means is a fuel filter.

17. A vehicle body of claim 12, further comprising a second fastening means for fastening said filler pipe to the back panel, said second fastening means having a second engagement device.

18. The vehicle body of claim 17, wherein the article means is held on said fastening means and said second fastening means by said engagement device and said second engagement device.

* * * * *